(12) United States Patent
Kobayashi et al.

(10) Patent No.: US 8,611,034 B2
(45) Date of Patent: Dec. 17, 2013

(54) MICROWAVE-ASSISTED MAGNETIC RECORDING DEVICE AND METHOD USING NON-CONSTANT MICROWAVE

(75) Inventors: Tatsuhiro Kobayashi, Tokyo (JP); Yoshikazu Soeno, Tokyo (JP); Akimasa Kaizu, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/436,563

(22) Filed: Mar. 30, 2012

(65) Prior Publication Data

US 2013/0258514 A1   Oct. 3, 2013

(51) Int. Cl.
G11B 5/455   (2006.01)

(52) U.S. Cl.
USPC .......................................................... 360/59

(58) Field of Classification Search
USPC .............. 360/59, 31; 369/13.13, 13.33, 13.26
See application file for complete search history.

(56) References Cited

U.S. PATENT DOCUMENTS

| 7,791,829 | B2* | 9/2010 | Takeo et al. ................... 360/55 |
| 2010/0232053 | A1 | 9/2010 | Yano et al. |
| 2011/0128648 | A1 | 6/2011 | Ezawa et al. |
| 2013/0050866 | A1* | 2/2013 | Matsubara et al. .............. 360/31 |

FOREIGN PATENT DOCUMENTS

JP   A-2010-3339   1/2010

OTHER PUBLICATIONS

Jian-Gang Zhu et al., Microwave Assisted Magnetic Recording, IEEE Transactions on Magnetics, vol. 44, No. 1 (Jan. 2008).

* cited by examiner

*Primary Examiner* — Nabil Hindi
(74) *Attorney, Agent, or Firm* — Posz Law Group, PLC

(57) ABSTRACT

A magnetic recording device includes a magnetic disk and a magnetic head that performs magnetic recording to the magnetic disk. The magnetic head includes a main magnetic pole layer and a microwave generating element. The magnetic recording device further includes a microwave generating element driving current control circuit. The microwave generating element driving current control circuit, during the magnetic recording, applies a microwave generating element driving current at a first current level to the microwave generating element for a period that is from at the latest a polarity reversal of the recording current before a subsequent polarity reversal of the recording voltage, and thereafter applies another microwave generating element driving current at a second current level, which is smaller than the first current level, to the microwave generating element, or stops the application of the another microwave generating element driving current until the polarity reversal of the recording voltage.

14 Claims, 7 Drawing Sheets

MICROWAVE-ASSISTED MAGNETIC RECORDING DEVICE AND METHOD USING NON-CONSTANT MICROWAVE

BACKGROUND OF THE INVENTION

1. Field of the Invention

The present invention relates to a magnetic recording device and a magnetic recording method, and more particularly to a magnetic recording device and a magnetic recording method using a microwave-assisted magnetic recording function for recording signals to a magnetic recording medium.

2. Description of the Related Art

In accordance with the increase of a recording density of a magnetic recording-reproducing device, which is represented by a magnetic disk driving device, the minuteness of bit cells of digital data is increased, the data being recorded to a magnetic recording medium. As a result, fluctuations of signals occur due to heat fluctuation, the signals being detected by a recording head element of a thin film magnetic head, and a signal to noise (S/N) ratio deteriorates. In the worst case, signals may disappear.

In such situation, in a magnetic recording medium that is used for a perpendicular magnetic recording system, which has been practically used in recent years, it is effective to increase perpendicular magnetic anisotropy energy Ku of a magnetic recording layer configuring the magnetic recording medium. On the other hand, a thermal stability index S, which corresponds to heat fluctuation, is expressed by a following expression, and it is said that the thermal stability index S should be normally 50 or more.

$$S = Ku \cdot V / k_B \cdot T \quad (1)$$

Ku: perpendicular magnetic anisotropy energy, V: volume of grains configuring a magnetic recording layer, $K_B$: Boltzmann constant, T: absolute temperature According to the Stoner-Wohlfarth model, an anisotropy magnetic field Hk and coercive force Hc of the magnetic recording layer are expressed by a following expression. With the Ku increasing, the coercive force Hc increases (note, Hk>Hc in a normal magnetic recording layer).

$$H = Hc = 2Ku/Ms \quad (2)$$

Ms: saturation magnetization of a magnetic recording layer

In order to perform a magnetization reversal of a magnetic recording layer that corresponds to a predetermined data series, a recording head element of a thin film magnetic head needs to apply a recording magnetic field having a steepness that is almost the same as that of an anisotropy magnetic field Hk of the magnetic recording layer. In a magnetic disk driving device that has been practiced using a perpendicular magnetic recording system, a recording head element using a single magnetic pole is used, and a recording magnetic field is applied in a perpendicular direction from an air bearing surface (ABS) thereof to a magnetic recording layer. The intensity of the perpendicular recording magnetic field is proportional to a saturation magnetic flux density Bs of a soft magnetic material that forms the single magnetic pole, and therefore a material having a high saturation magnetic flux density Bs has been developed and practiced. However, according to the Slater-Pauling curve, the saturation magnetic flux density Bs has a practical upper limitation when Bs=2.4 Tesla (T), so that the current situation has approached the practical limitation. A thickness and a width of a currently-used single magnetic pole is approximately 40-80 nm. However, in order to increase the recording density, the thickness and the width need to be decreased. With the decrease, a generated perpendicular magnetic field further decreases.

In order to resolve such problems, various technologies have ever been proposed. As one of those, a technology is known that applies an alternate-current (AC) magnetic field in addition to a regular recording magnetic field from a magnetic head, and the AC magnetic field has a frequency that corresponds to a medium magnetic resonance frequency in a state where a recording magnetic field is applied. When a frequency of the AC magnetic field is close to a magnetic resonance frequency of magnetic particles that configures a medium in a state where a recording magnetic field is applied, precession movement of spins is excited, thereby causing a magnetization reversal. The present technology theoretically uses this phenomenon. By applying such AC magnetic field, recording to a medium material having large Ku can be easily performed as attempting to decrease a recording magnetic field. Because a frequency of the applied AC magnetic field is in a microwave band of approximately several—several tens GHz, this technology is referred to as microwave-assisted magnetic recording. Hereinafter, the above-described AC magnetic field is referred to as a microwave magnetic field. A numeral simulation has validated that, when the technology is applied to the perpendicular magnetic recording, the significant decrease of the recording magnetic field is achieved and a high density recording becomes possible. Jian-Gang Zhu, Xiaochun Zhu, and Yuhui Tang, 'Microwave Assisted Magnetic Recording' IEEE TRANSACTIONS ON MAGNETICS, VOL. 44, NO. 1, JANUARY 2008 should be referred.

In the microwave-assisted magnetic recording, a system is known that supplies microwave signals (power) to a microwave generating element, the microwave signals being supplied from a microwave signal generating circuit that is formed independently from the magnetic head. The above-described system is called separate excitation system microwave-assisted magnetic recording. In this system, microwave signals (power) are supplied to the microwave generating element formed in a front end of the magnetic head via a microwave transmission line. JP Laid-Open Patent Application No. 2010-003339 discloses such a microwave transmission line and also discloses that a recording magnetic field for magnetic recording can be reduced by combining with a single magnetic pole type magnetic head.

However, JP Laid-Open Patent Application No. 2010-003339 doesn't disclose anything regarding application time duration of a microwave magnetic field, which is necessary for the magnetization reversal. When a microwave generating element driving current is continuously applied to the microwave generating element for the purpose of continuous application of microwave, consumption power of the microwave generating element becomes large. Also, when the consumption power of the microwave generating element is large, the microwave generating element may be fused due to heat generation of the element. Even when such a fusion does not occur, an air bearing surface may deform due to the heat, thereby allowing a flying state of the magnetic head to vary.

SUMMARY OF THE INVENTION

An objective of the present invention is to provide a magnetic recording device and a magnetic recording method that are applicable to a separate excitation system microwave-assisted magnetic recording and have a sufficient microwave-assisted magnetic recording performance while suppressing consumption power and excessive heating of a microwave generating element.

A magnetic recording device of the present invention includes a magnetic disk, a magnetic head that performs magnetic recording to the magnetic disk. The magnetic head includes a main magnetic pole layer that generates a recording magnetic field synchronizing recording current generated by recording voltage corresponding to recording signals and that applies the recording magnetic field to the magnetic disk, and a microwave generating element that is arranged in a vicinity of the main magnetic pole layer and that applies a microwave magnetic field to the magnetic disk during magnetic recording. The magnetic recording device further includes a microwave generating element driving current control circuit. The microwave generating element driving current control circuit, during the magnetic recording, applies a microwave generating element driving current at a first current level to the microwave generating element for a period that is from at the latest a polarity reversal of the recording current before a subsequent polarity reversal of the recording voltage, and thereafter applies another microwave generating element driving current at a second current level, which is smaller than the first current level, to the microwave generating element, or stops the application of the another microwave generating element driving current until the polarity reversal of the recording voltage.

A magnetic recording method of the present invention includes generating a recording current by a recording voltage corresponding to a recording signal; generating a recording magnetic field synchronizing the recording current; and applying the recording magnetic field and a microwave magnetic field simultaneously to a predetermined region of a magnetic disk so that magnetic recording to the magnetic disk is performed. During the magnetic recording, a microwave generating element driving current at a first current level is applied to the microwave generating element for a period that is from at the latest a polarity reversal of the recording current before a subsequent polarity reversal of the recording voltage, and thereafter, another microwave generating element driving current at a second current level, which is smaller than the first current level, is applied to the microwave generating element or the application of the another microwave generating element driving current is stopped until the polarity reversal of the recording voltage.

The inventors of the present application conducted a simulation regarding the relationship between the microwave magnetic field application time duration (time duration for applying microwave) and the magnetization reversal probability (probability of magnetic inversion). As a result, it was found that, only with applying the microwave magnetic field for a certain period from the reversal of the polarity of the magnetic recording current, that is the reversal of the recording magnetic field, a sufficiently large magnetization reversal probability can be obtained. In other words, it is not necessary to apply continuously the microwave magnetic field with the microwave generating element driving current at the same current level. A timing of applying the microwave magnetic field can be either a timing when at the latest the polarity of the recording current has reversed or a timing when the recording voltage has reversed. Therefore, by applying the microwave with the microwave generating element driving current at a required level during only time duration required for the magnetization reversal, and thereafter decreasing the current level or stopping the application of the microwave magnetic field, consumption power and excessive heating of the microwave generating element can be suppressed, and a sufficient microwave-assisted magnetic recording performance can be realized.

The above description, as well as other objects, features, and advantages of the present specification will be evident by the detailed description that follows below with reference to attached drawings exemplifying the present specification.

DETAILED DESCRIPTION OF THE INVENTION

Hereinafter, detailed descriptions will be given of several embodiments of the present invention with reference to the attached drawings.

(First Embodiment)

Figure 1:
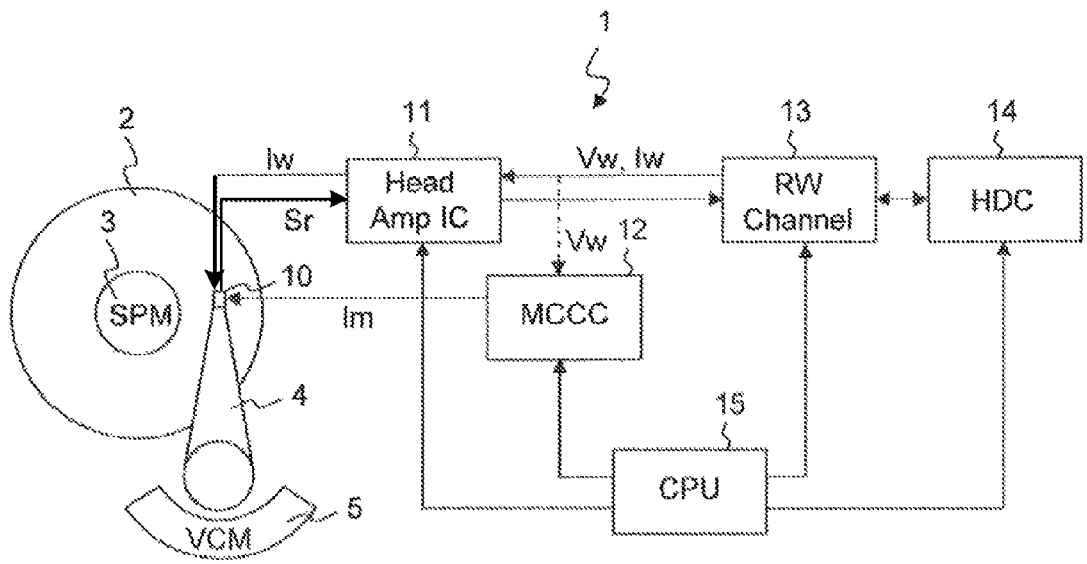
FIG. 1 is a block diagram that illustrates a main portion of a magnetic recording device according to a first embodiment of the present invention.

FIG. 1 is a block diagram that illustrates a main portion of a magnetic recording device according to a first embodiment of the present invention. A magnetic recording device 1 includes a magnetic disk 2 that is for recording magnetic information, and a magnetic head 10 that has a microwave-assisted magnetic recording function. The magnetic disk 2 is supported by a spindle motor (SPM) 3 so as to rotationally move. The magnetic head 10 is firmly attached to an actuator 4, and the actuator 4 is rotationally moved by a voice coil motor (VCM) 5. Accordingly, the magnetic head 10 travels in a radius direction of the magnetic disk 2.

The magnetic recording device 1 further includes a head amplifier integrated circuit (Head Amp IC) 11, a microwave generating element driving current control circuit (MCCC) 12, a reading-writing channel (RW Channel) 13, a magnetic disk controller (HDC) 14, and a microprocessor (CPU) 15.

The head amplifier integrated circuit 11 amplifies recording current Iw supplied from the reading-writing channel 13, and outputs to the magnetic head 10. Also, the head amplifier integrated circuit 11 amplifies reproducing signals output from the magnetic head 10, and outputs to the reading-writing channel 13.

The microwave generating element driving current control circuit 12 is a circuit that controls application of microwave (control means of a microwave generating element driving current), and that supplies the microwave generating element driving current to the magnetic head 10 based on recording voltage output from the reading-writing channel 13.

The reading-writing channel 13 is a signal processing circuit. The reading-writing channel 13 encodes recording data transferred from the magnetic disk controller 14 to be recorded to the magnetic disk 2, and generates recording voltage Vw corresponding to the recording signals. The reading-writing channel 13 further generates recording current Iw based on the recording voltage Vw, and outputs to the head amplifier integrated circuit 11. Similarly, the reading-writing channel 13 decodes reproducing signals Sr output from the head amplifier integrated circuit 11, and outputs to the magnetic disk controller 14.

The magnetic disk controller 14 configures an interface between the magnetic recording device 1 and a host system (not illustrated), and executes transfer control of recording-reproducing data.

The microprocessor 15 is a main control device of the magnetic recording device 1, and executes control of recording-reproducing operation and servo control that is necessary for positioning of the magnetic head 10. The microprocessor 15 sets parameters to each of resisters included in the head amplifier integrated circuit 11, the parameters being necessary for operations of the head amplifier integrated circuit 11.

Figure 2:
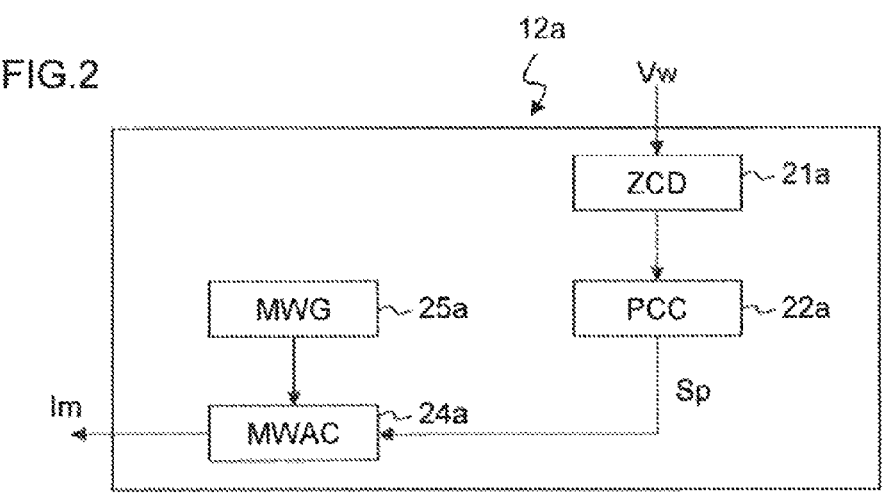
FIG. 2 is a block diagram that illustrates a configuration of a microwave generating element driving current control circuit according to the first embodiment.

FIG. 2 is a block diagram illustrating a configuration of the microwave generating element driving current control circuit 12a. The microwave generating element driving current control circuit 12a is provided with a zero crossing detector (ZCD) 21a, a pulse control circuit (PCC) 22a, a microwave amplifier circuit (MWAC) 24a, and a microwave generating circuit (MWG) 25a.

The zero crossing detector 21a detects a timing when polarity of the recording signals (or recording voltage Vw) reverses. The pulse control circuit 22a generates pulse signals Sp having a preset pattern and synchronizing the polarity reversal timing of the recording voltage Vw detected by the zero crossing detector 21a, and outputs to the microwave amplifier circuit 24a. The microwave generating circuit 25a is provided with a microwave oscillation element (not illustrated), and outputs microwave generated by the microwave oscillation element to the microwave amplifier circuit 24a. The microwave amplifier circuit 24a amplifies microwave supplied from the microwave generating circuit 25a based on a signal level of the pulse signals Sp output from the pulse control circuit 22a, and generates microwave generating element driving current Im. The microwave amplifier circuit 24a supplies the microwave generating element driving current Im to the microwave generating element 39 provided in the magnetic head 10.

Figure 3:
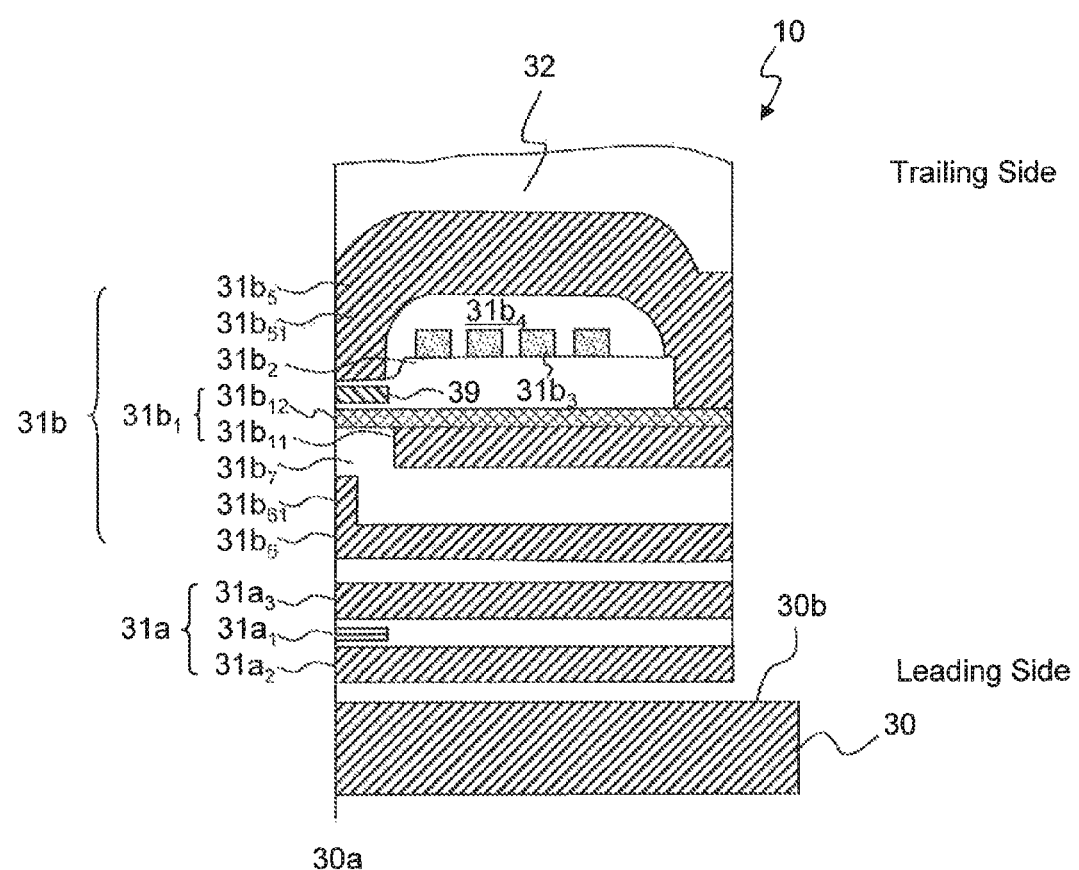
FIG. 3 is a schematic cross sectional view of a magnetic head.

FIG. 3 is a schematic cross sectional view of the magnetic head. The magnetic head 10 is provided with a substrate 30 that is made of ALTIC ($Al_2O_3$—TiC) or the like, and a reproducing head element 31a and a recording head element 31b for perpendicular magnetic recording, the elements being formed above the substrate 30. An air bearing surface 30a that is a surface facing the magnetic disk 2 of the magnetic head 10 is processed to obtain an appropriate flying height by receiving aerodynamic function from the rotationally moving magnetic disk 2.

The reproducing head element 31a includes an MR stack $31a_1$, and a lower shield layer 31a2 and an upper shield layer 31a3 that are arranged in a position to sandwich the MR stack 31a1. The MR stack 31a1 is configured with a GMR multi-layered film or a TMR multi-layered film, and detects signals from the magnetic disk 2. The lower shield layer 31a2 and the upper shield layer 31a3 prevent the MR stack 31a1 from detecting an external magnetic field as noise.

The recording head element 31b is provided with a main magnetic pole layer 31b1 that generates a recording magnetic field, a trailing gap layer 31b2, a writing coil 31b3, a writing coil insulating layer 31b4, an auxiliary magnetic pole layer 31b5, an auxiliary shield layer 31b6, and a leading gap layer 31b7. The writing coil 31b3 is formed so as to extend between the main magnetic pole layer 31b1 and the auxiliary magnetic pole layer 31b5.

The main magnetic pole layer 31b1 generates a magnetic flux (recording magnetic field) by applying the recording current Iw to the writing coil 31b3, and functions as a magnetic guide path to lead the generated magnetic flux as focusing to a magnetic recording layer 2e of the magnetic disk 2, to which writing is performed. The main magnetic pole layer 31b1 is configured with a main magnetic pole yoke layer 31b11 and a main magnetic pole major layer 31b12.

The auxiliary magnetic pole layer 31b5 and the auxiliary shield layer 31b6 are respectively arranged on the trailing side and the leading side of the main magnetic pole layer 31b1. Respectively on end parts of the auxiliary magnetic pole layer 31b5 and the auxiliary shield layer 31b6 on the ABS 30a side, a trailing shield part 31b51 and a leading shield part 31b61, each of which has a wider layer cross section than other portions, are formed. The trailing shield part 31b51 faces an end part of the main magnetic pole layer 31b1 on the ABS 30a side through the trailing gap layer 31b2 therebetween. The leading shield part 31b61 faces the end part of the main magnetic pole layer 31b1 on the ABS 30a side through the leading gap layer 31b7 therebetween. By providing the trailing shield part 31b51 and the leading shield part 31b61 that are described above, magnetic field gradients of recording magnetic fields between the trailing shield part 31b51 and the end part of the main magnetic pole layer 31b1 and between the end part of the leading shield part 31b61 and the end part of the main magnetic pole layer 31b1 become even steeper due to a magnetic flux shunt effect. As a result, signal output jitter is diminished, thereby decreasing an error rate at the time of reading. It is also possible to provide a so-called side surface shield by arranging portions of the auxiliary magnetic pole layer 31b5 or the auxiliary shield layer 31b6 in the vicinity of the both sides of the main magnetic pole layer 31b1 in the track width direction. In this case the magnetic flux shunt effect is enhanced.

The microwave generating element 39 is formed in the vicinity of the main magnetic pole layer 31b1, more specifically between the main magnetic pole major layer 31b12 of the main magnetic pole layer 31b1 and the trailing shield part 31b51 of the auxiliary magnetic pole layer 31b5. The microwave generating element 39 applies a microwave magnetic field to the magnetic disk 2 during magnetic recording.

Figure 4:
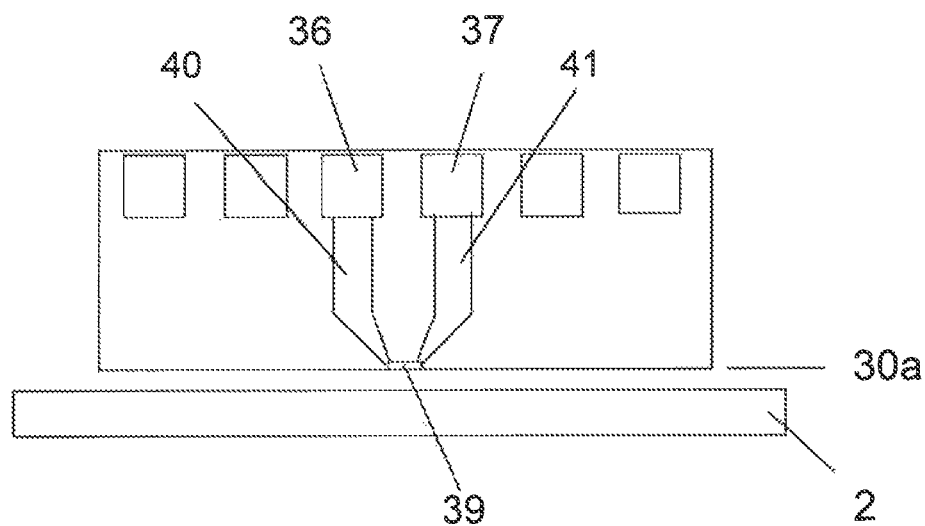
FIG. 4 is a conceptual view of a microwave generating element.

FIG. 4 is a plane view of the microwave generating element 39 from the perspective of the trailing side of the magnetic head 10. The microwave generating element 39 that is exposed to the air bearing surface 30a of the magnetic head 10 is electrically connected to terminal electrodes 36 and 37 via wiring members 40 and 41. The terminal electrodes 36 and 37 are electrically connected to the microwave amplifier circuit 24a. By supplying the microwave generating element driving current Im from the microwave amplifier circuit 24a via the terminal electrodes 36 and 37, the microwave generating element 39 generates a microwave magnetic field and applies the microwave magnetic field to a portion of the magnetic disk 2 facing the microwave generating element 39.

Figure 5:
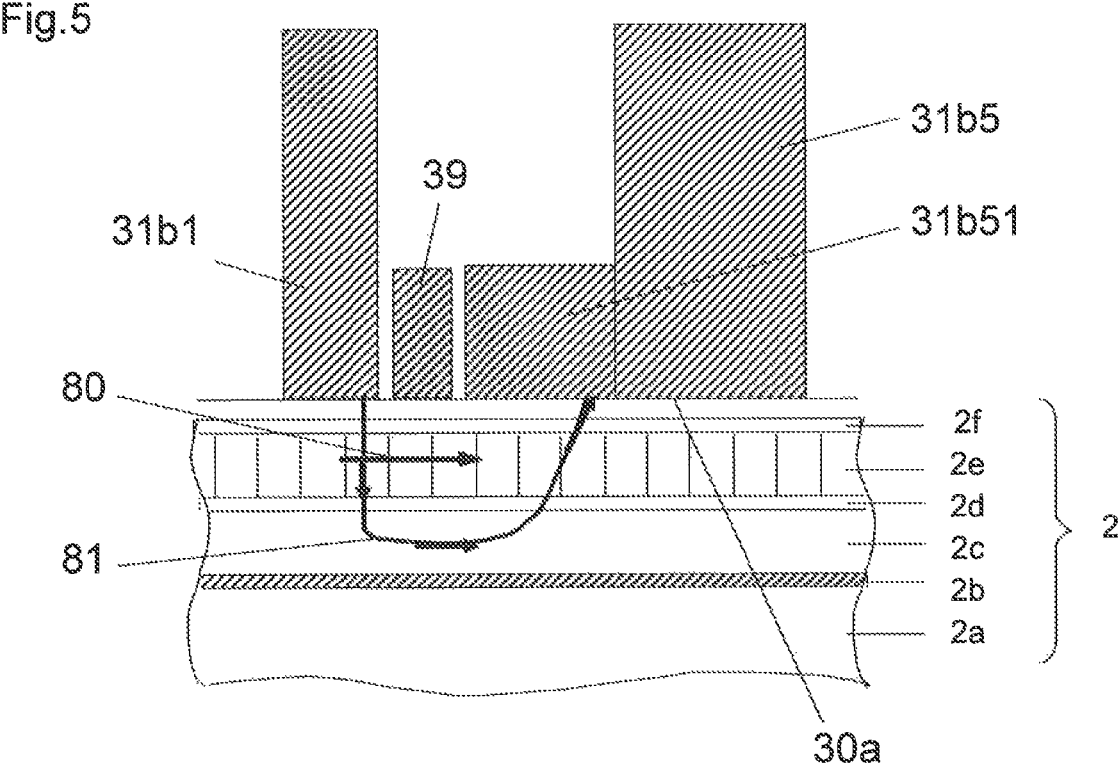
FIG. 5 is an explanatory view that illustrates a principle of a microwave-assisted magnetic recording method.

FIG. 5 is an explanatory view that illustrates a principle of a microwave-assisted magnetic recording method. The magnetic disk 2 has a multi-layered structure in which a magnetization orientation layer 2b, a soft magnetic back layer 2c that functions as a part of a magnetic flux loop circuit, an intermediate layer 2d, a magnetic recording layer 2e, a protective layer 2f are laminated above a disk substrate 2a in this order. The magnetization orientation layer 2b provides magnetic anisotropy to the soft magnetic back layer 2c, the magnetic anisotropy being in an in-plane direction of the magnetic disk 2. Due to this, a magnetic domain structure of the soft magnetic back layer 2c is stabilized, and spike shaped noise in a reproducing output waveform is suppressed. The intermediate layer 2d functions as an under layer that controls magnetization orientation and particle size of the magnetic recording layer 2e. The ferromagnetic resonance frequency $F_R$ of the magnetic recording layer 2e is an inherent value determined by shape, size, configuration elements, and the like of magnetic particles that configure the magnetic recording layer 2e, and, is approximately 1-50 GHz.

A microwave magnetic field is generated in the periphery of the microwave generating element 39 by applying the microwave generating element driving current Im to the microwave generating element 39. A frequency of the microwave magnetic field is also approximately 1-50 GHz. A resonance magnetic field 80 is applied in a substantially in-plane direction of the magnetic disk 2 to the inside of the magnetic disk 2 because the microwave generating element 39 is adjacent to the magnetic disk 2. The resonance magnetic field 80 is a high-frequency magnetic field in a microwave band having the ferromagnetic resonance frequency $F_R$ of the magnetic recording layer 2e of the magnetic disk 2 or a frequency close to the ferromagnetic resonance frequency $F_R$.

The coercive force of the magnetic recording layer 2e can be efficiently reduced by simultaneously applying a perpendicular recording magnetic field 81 and the resonance magnetic field 80 in a superimposition manner to a predetermined region of the magnetic disk 2, the perpendicular recording magnetic field 81 being applied from the main magnetic layer 31b1 of the recording head element 31b to the magnetic recording layer 2e. As a result, the intensity of the recording magnetic field in a perpendicular direction (direction perpendicular or substantially perpendicular to a top layer surface of the magnetic recording layer 2e), the recording magnetic field being necessary for writing, can be significantly reduced. When the coercive force is reduced, a magnetization reversal is more likely to occur, realizing efficient recording with a small recording magnetic field.

Figure 6:
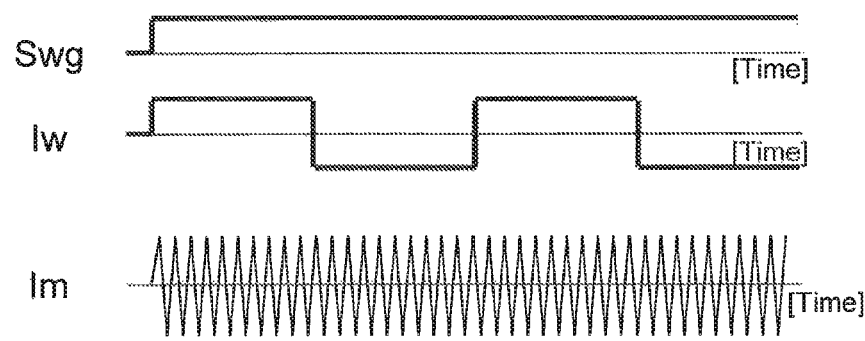
FIG. 6 is a timing chart regarding a microwave generating element driving current according to a comparative example.

FIG. 6 is a timing chart regarding a microwave generating element driving current for a comparison with the present invention. At timing when writing gate signals Swg output from the reading-writing channel 13 to the head amplifier integrated circuit 11 turn to ON, the recording current Iw is supplied from the head amplifier integrated circuit 11 to the magnetic head 10. Simultaneously with this, the microwave generating element driving current Im at a certain current level is supplied from the microwave amplifier circuit 24a to the microwave generating element 39, and a microwave magnetic field with a certain intensity is continuously applied to the magnetic disk 2.

Figure 7:
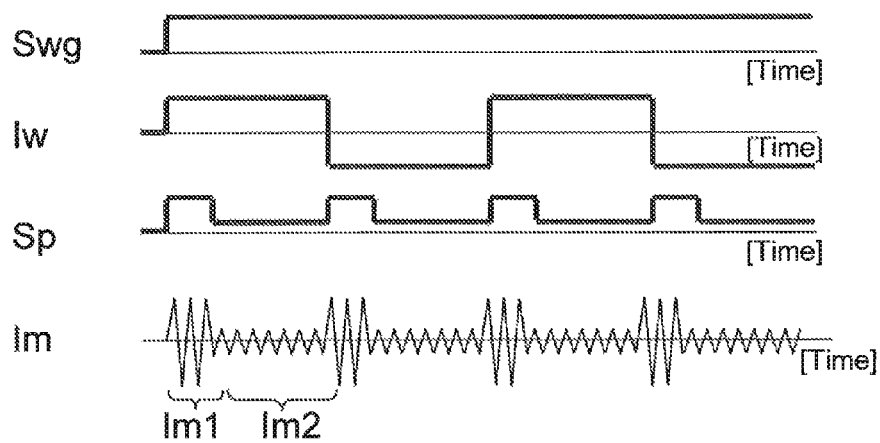
FIG. 7 is a timing chart regarding a microwave generating element driving current according to the first embodiment.

FIG. 7 is a timing chart regarding the microwave generating element driving current according to the present embodiment. When the writing gate signals Swg turn to ON during magnetic recording in the same way as described above, the head amplifier integrated circuit 11 supplies the recording current Iw corresponding to the recording voltage Vw to the magnetic head 10. When the recording current Iw is applied to the coil 31b3, the recording head element 31b of the magnetic head 10 generates a recording magnetic field corresponding to the recording current Iw from the main magnetic pole layer 31b1.

The pulse control circuit 22a generates a pulse control circuit output Sp having a predetermined pattern and synchronizing a polarity reversal of the recording voltage Vw, and the pulse control circuit output Sp is supplied to the microwave amplifier circuit 24a. Microwave (ac current at a certain amplitude) at a certain level is supplied from the microwave generating circuit 25a to the microwave amplifier circuit 24a. The microwave amplifier circuit 24a amplifies the microwave by an amplification ratio in proportion to a level of the pulse control circuit output Sp, generates the microwave generating element driving current Im, and outputs to the microwave generating element 39. As described above, the microwave generating element 39 generates a microwave magnetic field having a waveform pattern following the pulse control circuit output Sp.

Microwave generating element driving current Im1 at a first current level (current amplitude) synchronizing the polarity reversal of the recording voltage Vw is first applied to the microwave generating element 39. The microwave generating element driving current Im1 at the first current level is applied for a period before a subsequent reversal of the recording voltage Vw. During the period, a magnetization of the magnetic disk 2 is continuously increased, and the microwave generating element driving current Im1 at the first current level is applied for a time duration that is needed to saturate the increase of a magnetization reversal probability of a portion of the magnetic disk 2 to which the recording magnetic field is applied or for a time duration longer than the time duration. For a period until the subsequent polarity reversal of the recording voltage Vw after the period in which the microwave generating element driving current Im1 is applied, microwave generating element driving current Im2 at a second current level (current amplitude) that is smaller than the first current level is applied. In one cycle from the polarity reversal of the recording voltage Vw to the subsequent polarity reversal of the recording voltage Vw, the microwave generating element driving current Im1 at the first current level is at first applied, and then the microwave generating element driving current Im2 at the second current level is applied. Thereafter, this cycle is repeatedly executed.

When a current value of the microwave generating element driving current Im is lowered to the second current level before the increase of the magnetization of the magnetic disk 2 is saturated, the magnetization reversal is not sufficiently proceeded. On the other hand, in the present embodiment, because the microwave generating element driving current Im1 at the first current level is applied until the increase of the magnetization of the magnetic disk 2 is saturated, sufficient magnetization reversal is obtained. Furthermore, because the current value of the microwave generating element driving current Im is decreased to the second current level thereafter, consumption power of the microwave generating element 39 is suppressed compared to the case where the microwave generating element driving current Im1 at the first current level is continuously applied without any interval. Therefore, while the consumption power is suppressed, the microwave assisted recording performance that is the same as the one of the case when the microwave magnetic field at a certain level is continuously applied is achieved.

An amount of heat generation of the microwave generating element 39 during driving is determined by a product of an application intensity and an application time duration of microwave. According to the present embodiment, the microwave generating element driving current Im1 at the certain current value synchronizing the polarity reversal of the recording voltage Vw is applied, and after a passage of the predetermined period, the microwave generating element driving current Im2 with the smaller current value is applied. Therefore, compared to the case where microwave with a high current value is continuously applied, an amount of heat generation of the microwave generating element 39 is allowed to be suppressed.

The waveform pattern of the pulse control circuit output Sp is a rectangular pulse in the present embodiment, but not limited to this. For example, waveform patterns such as sine wave, triangular wave, and the like are also applicable. Alternatively, a waveform pattern is also applicable in which the pulse control circuit output Sp decreases stepwise at three or more of current levels in the one cycle. Also alternatively, another rectangular pulse pattern is applicable in which the pulse control circuit output Sp decreases in a stepwise manner in the one cycle.

Figure 8:
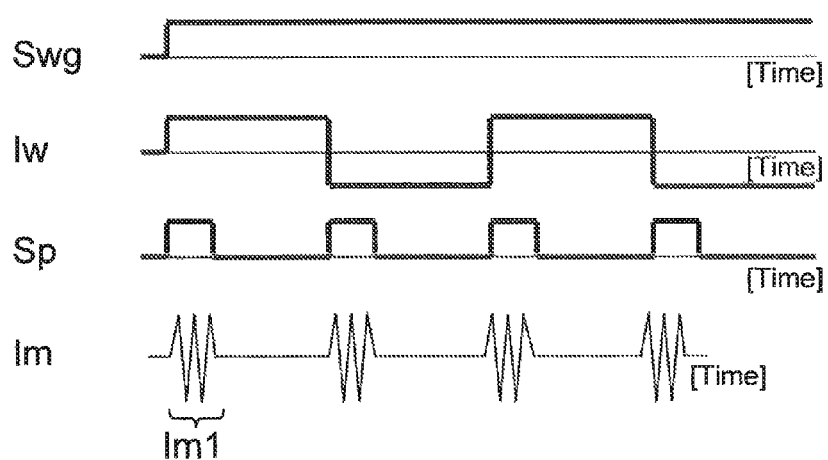
FIG. 8 is a timing chart regarding a microwave generating element driving current according to a modified example of the first embodiment.

FIG. 8 is a preferable modified example according to the first embodiment. In the present modified example, after the microwave generating element driving current Im1 at the first current level is applied for a certain period, a microwave generating element driving current level is changed to zero. In other words, application of the microwave generating element driving current Im is stopped. As a result, further suppression of the consumption power and the amount of heat generation of the microwave generating element 39 becomes possible.

Figure 9:
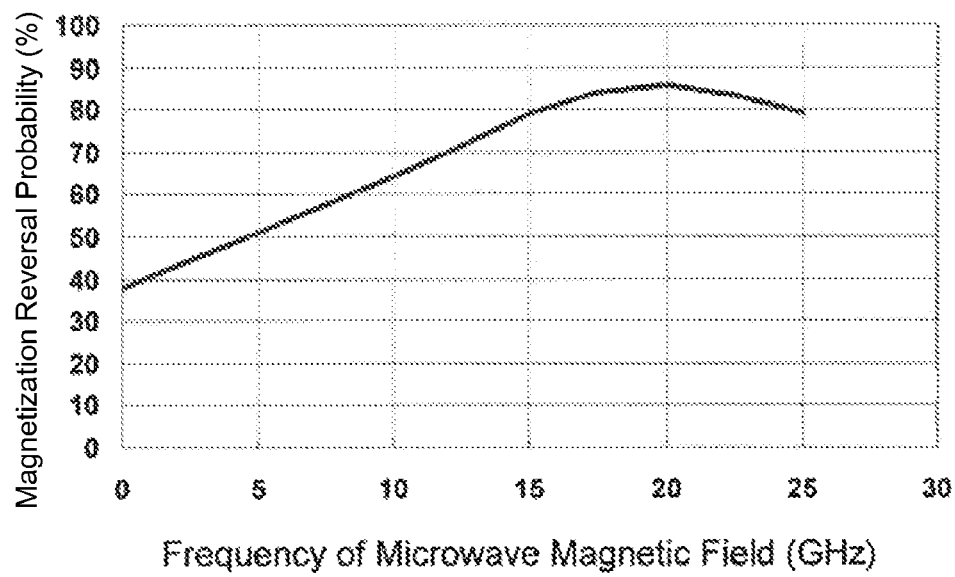
FIG. 9 is a graph that illustrates the relationship between the microwave frequency and the magnetization reversal probability of a magnetic recording layer.

FIG. 9 illustrates the magnetization reversal probability (probability of magnetic inversion) of the magnetic recording layer to which microwave is continuously applied in accordance with the frequency of microwave. The magnetization reversal probability of a case where a frequency of recorded signals is 50 MHz was obtained by a calculator simulation. A magnetic field intensity from the recording head 10 was −2.5 kOe, which is near a nucleation magnetic field intensity, and a microwave magnetic field intensity was 1 kOe. From the figure, it is recognized that application of microwave at 20 GHz excites magnetization reversal most effectively.

Figure 10:
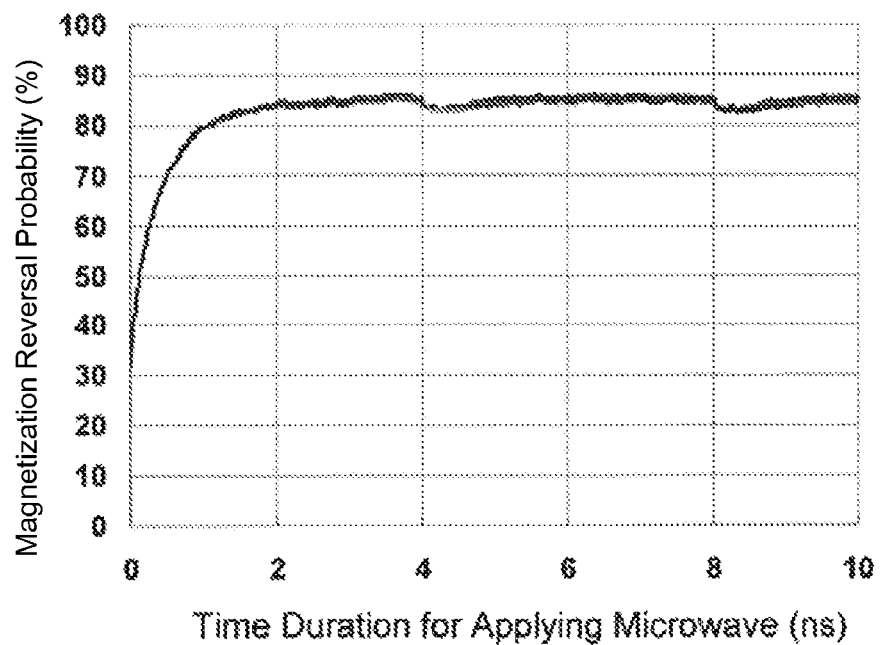
FIG. 10 is a graph that illustrates the relationship between the microwave magnetic field application time duration (time duration for applying microwave) and the magnetization reversal probability of the magnetic recording layer.

FIG. 10 illustrates the relationship between the microwave magnetic field application time duration and the magnetization reversal probability (probability of magnetic inversion) of the magnetic recording layer. Also in this time, the magnetization reversal probability was obtained by a calculator simulation using recorded signals having a frequency of 50 MHz. According to the embodiment illustrated in FIG. 8, the microwave generating element driving current, in other words, the microwave magnetic field intensity, is changed to zero after the microwave generating element driving current Im1 at the first current level is applied. The microwave frequency was set to 20 GHz, which had the highest effect of promoting magnetization reversal in FIG. 9. From FIG. 10, it is recognized that the increase of the magnetization reversal probability is saturated when the application time duration of the microwave generating element driving current Im1 at the first current level exceeds approximately 2 ns. Therefore, in the case of the example of FIG. 10, effective magnetization reversal is induced by applying the microwave generating element driving current Im1 at the first current level for a time duration of 2 ns or more. In order to record signals at 50 MHz, because a time duration from the polarity reversal of the recording voltage Vw to the subsequent reversal is 10 ns, the time duration for the application of the microwave generating element driving current Im1 at the first current level is preferably less than 10 ns, and more preferably approximately 2 ns.

It is possible to obtain an application time duration of the microwave generating element driving current Im that is required to saturate the increase of the magnetization reversal probability beforehand by the above-described calculator simulation. It is possible to define saturation as needed. In one example, it can be determined as that the increase of the magnetization reversal probability is saturated when a gradient of the graph illustrated in FIG. 10, in other words, a change rate of the magnetization reversal probability in accordance with the time duration, reaches approximately 1%/ns or 2%/ns.

(Second Embodiment)

The present embodiment is the same as the first embodiment except for that a configuration of the microwave generating element driving current control circuit and an application timing of the microwave generating element driving current Im are different from those of the first embodiment. In the present embodiment, the microwave generating element driving current Im1 at the first current level is applied synchronizing a polarity reversal of the recording current Iw.

Figure 11:
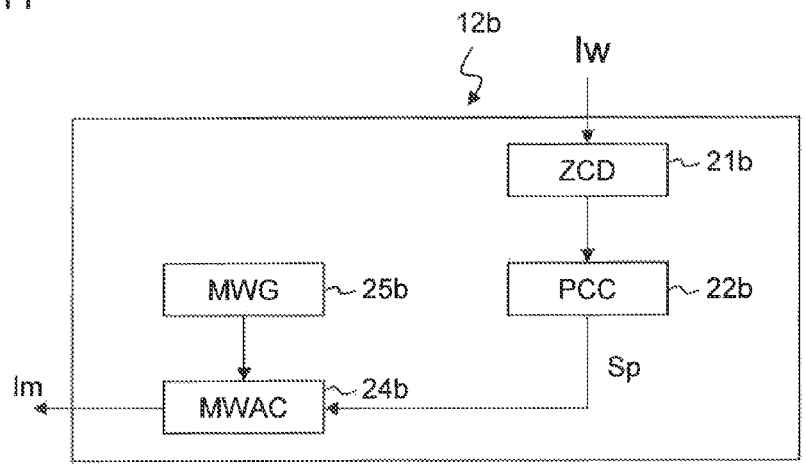
FIG. 11 is a block diagram that illustrates a configuration of a microwave generating element driving current control circuit according to a second embodiment.

FIG. 11 is a block diagram that illustrates a configuration of a microwave generating element driving current control circuit 12b according to the present embodiment. The microwave generating element driving current control circuit 12b is provided with a zero crossing detector 21b, a pulse control circuit 22b, a microwave amplifier circuit 24b, and a microwave generating circuit 25b. Configurations of the above-described circuits are the same as the first embodiment. However, the zero crossing detector 21b detects a timing of a polarity reversal of the recording current Iw output from the head amplifier integrated circuit 11, and the pulse control circuit 22b outputs the pulse control circuit output Sp synchronizing the polarity reversal of the recording current Iw.

Figure 12:
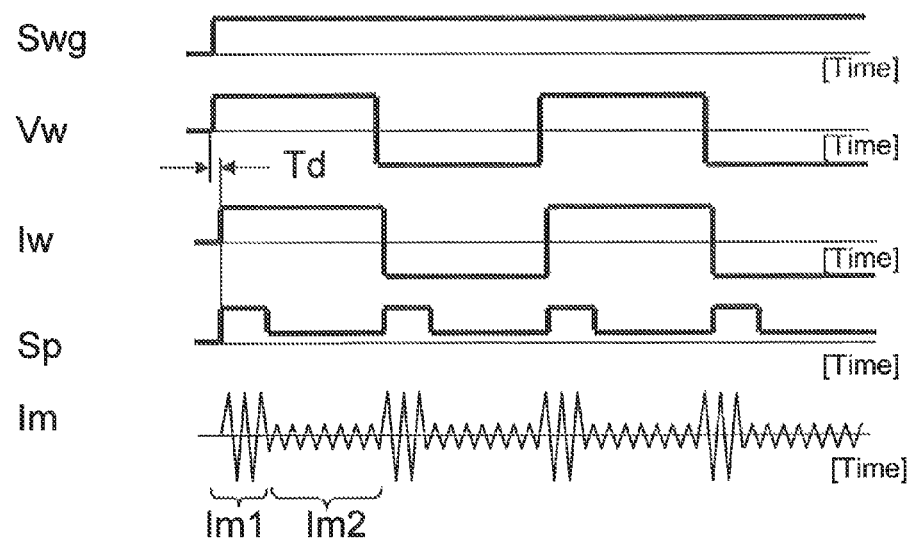
FIG. 12 is a timing chart regarding a microwave generating element driving current according to the second embodiment.

FIG. 12 is a timing chart regarding a microwave generating element driving current according to the present embodiment. When the writing gate signals Swg output to the head amplifier integrated circuit 11 turn to ON during magnetic recording, the head amplifier integrated circuit 11 supplies the recording current Iw corresponding to the recording voltage Vw to the magnetic head 10. When the recording current Iw is applied to the coil 31b3, the recording head element 31b of the magnetic head 10 applies a recording magnetic field corresponding to the recording current Iw from the main magnetic pole layer 31b1.

The zero crossing detector 21b detects a timing when the polarity of the recording current Iw reverses. The pulse control circuit 22b generates a pulse control circuit output Sp having a predetermined pattern synchronizing to the polarity reversal of the recording current Iw, and supplies to the microwave amplifier circuit 24b. Microwave at a certain amplitude is supplied from the microwave generating circuit 25b to the microwave amplifier circuit 24b. The microwave amplifier circuit 24b amplifies the microwave by an amplification ratio corresponding to a level of the pulse control circuit output Sp, generates the microwave generating element driving current Im, and transfers to the microwave generating element 39. As described above, the microwave generating element 39 generates a microwave magnetic field having a waveform pattern following the pulse control circuit output Sp synchronizing the generation of the recording magnetic field from the main magnetic pole layer 31*b*1.

The recording element 31*b* of the magnetic head 10 has the coil 31*b*3, and the recording current Iw that is supplied from the head amplifier integrated circuit 11 to the magnetic head 10 has a delay Td (phase delay) as compared to the recording voltage Vw due to the inductance component induced by the coil 31*b*3. However, phase difference does not occur between the recording current Iw and the recording magnetic field. Accordingly, in the present embodiment, by generating the pulse control circuit output Sp synchronizing the polarity reversal of the recording current Iw, it becomes possible to compensate the delay time duration Td. As a result, it is possible to apply the microwave magnetic field simultaneously with applying the recording magnetic field, and thereby efficient magnetization reversal is realized.

(Third Embodiment)

The present embodiment is the same as the first embodiment except for that a configuration of the microwave generating element driving current control circuit and an application timing of the microwave generating element driving current Im1 at the first current level are different from those of the first embodiment. In the present embodiment, after the passage of a predetermined delay time duration for compensating a phase difference between the recording voltage Vw and the recording current Iw from a polarity reversal of the recording voltage Vw, the microwave generating element driving current Im1 at the first current level is applied.

Figure 13:
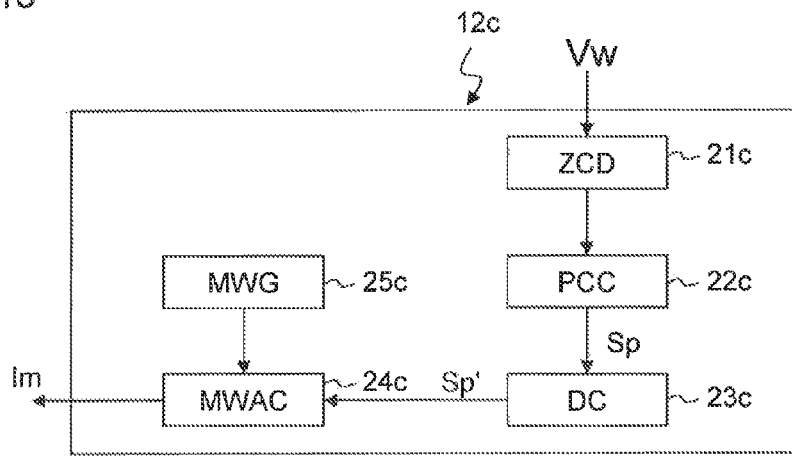
FIG. 13 is a block diagram that illustrates a configuration of a microwave generating element driving current control circuit according to a third embodiment.

FIG. 13 is a block diagram that illustrates a configuration of a microwave generating element driving current control circuit 12*c* according to the present embodiment. A microwave generating element driving current control circuit 12*c* is provided with a zero crossing detector 21*c*, a pulse control circuit 22*c*, a delay circuit 23*c*, a microwave amplifier circuit 24*c*, and a microwave generating circuit 25*c*. Configurations of the above-described circuits are the same as the first embodiment except for the delay circuit 23*c*. The delay circuit 23*c* outputs a delay circuit output Sp' that is obtained by delaying the pulse control circuit output Sp for a predetermined time duration, the pulse control circuit output Sp being obtained from the recording voltage Vw.

Figure 14:
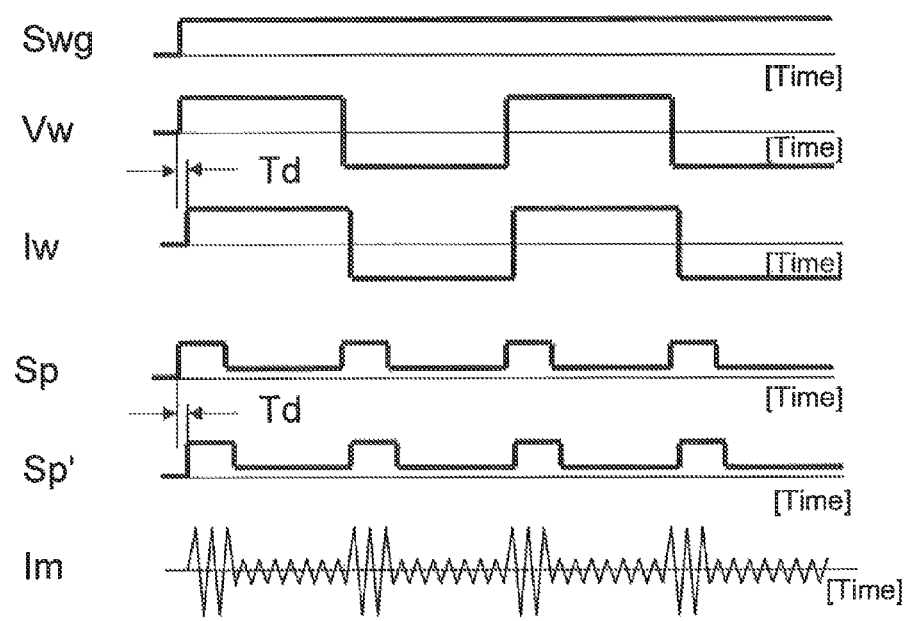
FIG. 14 is a timing chart regarding a microwave generating element driving current according to the third embodiment.

FIG. 14 is a timing chart regarding a microwave generating element driving current according to the present embodiment. When the writing gate signals Swg output to the head amplifier integrated circuit 11 turn to ON during magnetic recording, the head amplifier integrated circuit 11 supplies the recording current Iw corresponding to the recording voltage Vw to the magnetic head 10. When the recording current Iw is applied to the coil 31*b*3, the recording head element 31*b* of the magnetic head 10 applies a recording magnetic field corresponding to the recording current Iw from the main magnetic pole layer 31*b*1.

The zero crossing detector 21*c* detects a timing when the polarity of recording voltage Vw reverses. The pulse control circuit 22*c* generates a pulse control circuit output Sp having a predetermined pattern synchronizing the polarity reversal of the recording voltage Vw detected by the zero crossing detector 21*c*. The pulse control circuit 23*c* adds a predetermined time duration delay (phase difference) to the pulse control circuit output Sp, generates a delay circuit output Sp', and supplies the delay circuit output Sp' to the microwave amplifier circuit 24*c*. Microwave at a certain amplitude is supplied from the microwave generating circuit 25*c* to the microwave amplifier circuit 24*c*. The microwave amplifier circuit 24*c* amplifies the microwave by an amplification ratio corresponding to a level of the delay circuit output Sp', generates the microwave generating element driving current Im, and transfers to the microwave generating element 39. As described above, the microwave generating element 39 generates a microwave magnetic field having a waveform pattern following the delay circuit output Sp' synchronizing the generation of the recording magnetic field from the main magnetic pole layer 31*b*1.

As described in the second embodiment, the recording current Iw that is supplied from the head amplifier integrated circuit 11 has a delay Td (phase delay) as compared to the recording voltage Vw due to the inductance component of the coil 31*b*3. Thereby, a delay also occurs to the recording magnetic field as compared to the recording voltage Vw. In the present embodiment, by using the delay circuit output Sp', it becomes possible to compensate the delay, the output Sp' being obtained by delaying the pulse control circuit output Sp for a time duration preset by the delay circuit 23*c*. The delay time duration is preferably the time Td that corresponds to the phase difference between the recording current Iw and the recording voltage Vw. In that case, it is possible to apply the microwave magnetic field simultaneously with applying the recording magnetic field, and thereby efficient magnetization reversal is realized. Note, the delay time duration may also be an arbitrary time duration that is zero or more and less than the time duration Td.

Several preferable embodiments of the present invention have been illustrated and described in detail; however, it is understood that various changes and modifications can be made without departing from the essence and scope of the attached claims.

What is claimed is:

1. A magnetic recording device, comprising:
   a magnetic disk;
   a magnetic head that performs magnetic recording to the magnetic disk, including:
      main magnetic pole layer that generates a recording magnetic field synchronizing a recording current generated by recording voltage corresponding to recording signals and that applies the recording magnetic field to the magnetic disk; and
      a microwave generating element that is arranged in a vicinity of the main magnetic pole layer and that applies a microwave magnetic field to the magnetic disk during magnetic recording; and
   a microwave generating element driving current control circuit
      that, during the magnetic recording, applies a microwave generating element driving current at a first current level to the microwave generating element for a period that is from at the latest a polarity reversal of the recording current before a subsequent polarity reversal of the recording voltage, and thereafter
      that applies another microwave generating element driving current at a second current level, which is smaller than the first current level, to the microwave generating element, until the polarity reversal of the recording voltage.

2. The magnetic recording device according to claim 1, wherein
   the microwave generating element driving current control circuit applies the microwave generating element driving current at the first current level in synchronization with the polarity reversal of the recording voltage.

3. The magnetic recording device according to claim 1, wherein
   the microwave generating element driving current control circuit applies the microwave generating element driving current at the first current level in synchronization with the polarity reversal of the recording current.

4. The magnetic recording device according to claim 1, wherein
the microwave generating element driving current control circuit applies the microwave generating element driving current at the first current level after a passage of a predetermined delay time duration from the polarity reversal of the recording voltage to compensate a phase difference between the recording voltage and the recording current.

5. The magnetic recording device according to claim 1, wherein
the microwave generating element driving current control circuit applies the microwave generating element driving current at the first current level for a time duration or more, the time duration being required to saturate an increase of a magnetization reversal probability of a portion of the magnetic disk to which the recording magnetic field is applied.

6. A magnetic recording method, comprising:
generating a recording current by a recording voltage corresponding to a recording signal;
generating a recording magnetic field synchronizing the recording current; and
applying the recording magnetic field and a microwave magnetic field simultaneously to a predetermined region of a magnetic disk so that magnetic recording to the magnetic disk is performed, wherein
during the magnetic recording, a microwave generating element driving current at a first current level is applied to the microwave generating element for a period that is from at the latest a polarity reversal of the recording current before a subsequent polarity reversal of the recording voltage, and thereafter,
another microwave generating element driving current at a second current level, which is smaller than the first current level, is applied to the microwave generating element or the application of the another microwave generating element driving current is stopped until the polarity reversal of the recording voltage.

7. The magnetic recording method according to claim 6, wherein
the microwave generating element driving current at the first current level is applied in synchronization with the polarity reversal of the recording voltage.

8. The magnetic recording method according to claim 6, wherein
the microwave generating element driving current at the first current level is applied in synchronization with the polarity reversal of the recording current.

9. The magnetic recording method according to claim 6, wherein
the microwave generating element driving current at the first current level is applied after a passage of a predetermined delay time duration from the polarity reversal of the recording voltage to compensate a phase difference between the recording voltage and the recording current.

10. The magnetic recording method according to claim 6, wherein
the microwave generating element driving current at the first current level is applied for a time duration or more, the time duration being required to saturate an increase of a magnetization reversal probability of a portion of the magnetic disk to which the recording magnetic field is applied.

11. The magnetic recording device according to claim 1, wherein
the microwave generating element driving current is an alternating current, and
the microwave generating element driving current at the first current level is positively and negatively symmetric.

12. The magnetic recording device according to claim 1, wherein
the microwave generating element driving current is an alternating current, and
the microwave generating element driving current at the second current level is positively and negatively symmetric.

13. The magnetic recording method according to claim 6, wherein
the microwave generating element driving current is an alternating current, and
the microwave generating element driving current at the first current level is positively and negatively symmetric.

14. The magnetic recording method according to claim 6, wherein
the microwave generating element driving current is an alternating current, and
the microwave generating element driving current at the second current level is positively and negatively symmetric.

* * * * *